Figure 1:
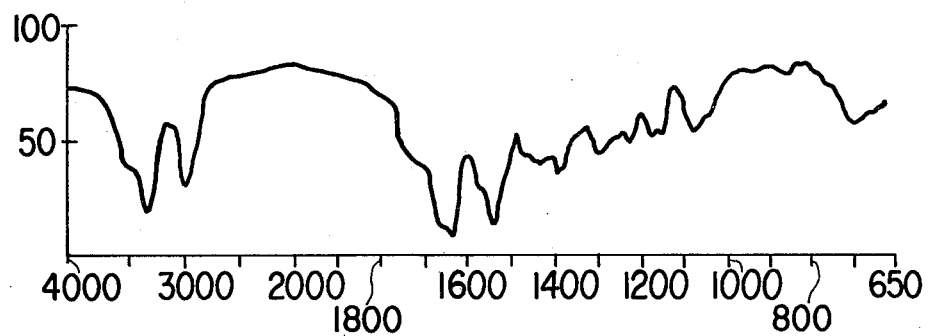

United States Patent [19]
Murao et al.

[11] 3,878,185
[45] Apr. 15, 1975

[54] PEPSIN INHIBITORS AND PREPARATION THEREOF

[76] Inventors: Sawao Murao, 8-12, 2-cho, Horiagemidori-cho, Osaka; Shuzo Satoi, 11-5, i- chome, Sumiyoshi-Kamokgahara cho, Kobe; Noriaki Kuwana, 74, Higashiohizumi-cho, Tokyo; Masayuki Fukumura, 2447-1, Hiratsuka Hirarsukushi, Hiratsuka; Tamio Kawamura, 12-8, 5 chome, Koishikawa, Tokyo, all of Japan

[22] Filed: Apr. 28, 1971

[21] Appl. No.: 138,083

[30] Foreign Application Priority Data
Apr. 28, 1970 Japan.............................. 45-35900

[52] U.S. Cl. ................. 260/112.5; 195/29; 424/177
[51] Int. Cl..... C07c 103/52; C07g 7/00; C08h 1/00
[58] Field of Search.................. 195/80 R; 260/112.5

[56] References Cited
UNITED STATES PATENTS
3,740,319  6/1973  Umezawa et al.................. 195/80 R
3,840,513  10/1974  Umezawa et al. ............... 260/112.5
3,840,516  10/1974  Umezawa et al. ............... 260/112.5

OTHER PUBLICATIONS
Umezawa et al., J. of Antibiotics, 23, 259 (1970).
Morishima et al., J. of Antibiotics, 23, 263 (1970).
L. Fieser and M. Fieser, "Reagents for Organic Synthesis," Wiley and Sons, N.Y. (1967), pp. 192–193.

Primary Examiner—Lewis Gotts
Assistant Examiner—Reginald J. Suyat
Attorney, Agent, or Firm—Cooper, Dunham, Clark, Griffin & Moran

[57] ABSTRACT

New substances named "substance S-PI" and "substance Me S-PI" are concerned which are effective as pepsin inhibitor, the latter substance being methyl ester of the former. The substance S-PI is prepared by fermentation of a new strain of microorganism which has been isolated from soil by the present inventors and named the Streptomyces naniwaensis (EF 44-201), whereas the substance Me S-PI is prepared by methyl esterifying the former substance. A specimen of the Streptomyces naniwaensis (EF 44-201) has been deposited to the American Type Culture Collection under the assinged Number ATCC 21689.

2 Claims, 1 Drawing Figure

SAWAO MURAO
SHUZO SATOI
NORIAKI KUWANA
MASAYUKI FUKUMURA
TAMIO KAWAMURA
INVENTORS

BY

ATTORNEY

PEPSIN INHIBITORS AND PREPARATION THEREOF

This invention relates to the new pepsin inhibitors hereinafter called "substance S-PI" and "substance Me S-PI," the methyl ester of the former, and a process for the preparation thereof. These substances are characterized by their enhanced inhibiting effect against enzymatic activity of acid protease and in particular pepsin.

The substance S-PI and the substance Me S-PI according to the present invention are represented by the formula

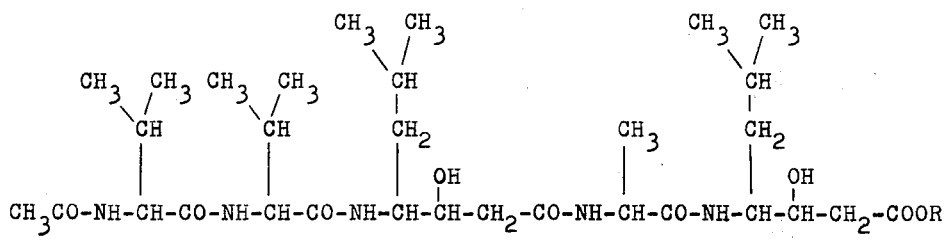

wherein R is hydrogen or methyl, and when R is hydrogen, the formula represents the substance S-PI, whereas when R is methyl, the formula represents the substance Me S-PI.

According to the present invention, the substance S-PI is obtained by fermenting the Streptomyces naniwaensis (EF 44-201) in a suitable nutrient medium and recovering the said substance as a metabolite from the fermentation broth. The other substance, that is, the substance Me S-PI, on the other hand, is obtained by further treatment of the said substance S-PI with a methylating agent.

It was well known that substances having inhibitory effect against enzymatic action of trypsin and microbial proteases are widely distributed in natural sources, such as beans, cereals, potatoes, egg-white, blood and the like (comp. "The Enzymes" 4, pages 128 and 213 (1960), reported by P. D. Boyer et al.).

It was, however, hitherto scarcely known that a substance having inhibitory effect against protease and especially acid protease is formed as a metabolite of microorganism.

K. Matsuhima et al reported that they had succeeded to isolate a protease inhibitor from extract of fermentation of the Penicilium cyclopium [comp. Agricultural and Biological Chemistry (Japan), 53, pages 544 and 549 (1969)]. The authors in the article mention that the said protease inhibitor does not nevertheless show any inhibition against pepsin which is a typical acid protease.

Recently, in accompany with a remarkable advance in the pharmacological studies with regard to ulceration of digestive organs, many attempts are directed to the aspect of enzymatic action of pepsin in order to solve the causes of ulceration as well as developments of ulcers.

It was known that sulfuric acid esters of polysaccharide are effective anti-ulcer agent. The pharmacological effects of these substances are supported mainly by their pepsin inhibitory activity. Unfortunately, it is, however, known that the substances, when administrated, are accompanied with injurious side-effect such as prevention of blood-coagulation.

The first object of the present invention is to provide new pepsin inhibitors, namely, the substance S-PI and the substance Me S-PI which have no undesirable side-effect such as that presented by the known sulfuric acid esters of polysaccharide.

The second object of the present invention is to provide a process for the production of the said substance S-PI by fermentation of a new Actimomycetes.

The third object of the present invention is to provide a process for the production of the substance Me S-PI by chemical treatment of the substance S-PI.

As the result of extensive search over wide range of microorganisms, we have succeeded in finding out a strain belonging to the genus Streptomyces which is capable of producing a new pepsin inhibitor as a metabolite of said strain. The present invention indeed relys upon the discovery and utilization of said microorganism for the production of said new pepsin inhibitor, namely, the substance S-PI.

Surprisingly, we have found that the substance S-PI exhibits a remarkable activity as pepsin inhibitor, its pepsin inhibitory activity amounting to approximate 10 thousand times of that presented by the known sulfuric acid esters of polysaccharide. The substance S-PI is an oligopeptide having the chemical composition represented by the aforementioned formula, which is quite different from that of the known sulfuric acid esters of polysaccharide, and is free from undesirable side-effect such as prevention of blood-coagulation.

The substance Me S-PI also shows pepsin inhibitory effect almost equivalent to that of the substance S-PI. The both substances are therefore equally utilizable for treatment in safety of patient suffering from peptic-ulcer.

The strain utilized in carrying out the process of the present invention has been isolated by the present inventors from soil in Japan and named Streptomyces naniwaensis (EF 44-201).

Specimens of said strain have been deposited to the Fermentation Research Institute of Japan under FERM-P No. 278, and also to the American Type Culture Collection under the assigned Number ATCC 21689.

The vegetative mycelium of the strain forms many branched mycelia having diameter of about 1 micron and forms abundant aerial mycelia.

Well grown aerial mycelium of the strain is fragmented by septation to form sporophore but not sporangium. The vegetative mycelium of the strain does not septate. From the fact above mentioned, the strain is identified to be Streptomyces (Genus).

Further bacteriological characteristics of said strain are as follows:

A. Morphorogical characteristics
1. Aerial mycelium:
    Aerial mycelium is abundant.
    Sporphores are long loose spirals and irregularly branch.
2. Spore:
    Oval or eliptical, irregular in sizes of from 0.5 to 0.8 × 0.9 to 1.5 microns inclusive.
    Surfaces of spore are covered with long spines.

B. Growth of the strain in various nutrient media at 27°C. for 14 days is tabulated in the following Table:

In the above, the sign (−) denotes the negative utilization; the sign (+) the positive utilization, and the sign (±) the uncertain utilization, respectively.

Fermentation of Streptomyces naniwaensis (EF 44-201) for the production of the substance S-PI according to the present invention may be conducted in accordance with conventional arts and knowledges hitherto known with respect to the fermentation of Actinomycetes. In preparation of a suitable nutrient medium, there may be employed as essential ingredients, a nitrogen source such as soybean meal, corn steep liquor, peptone, yeast extract, meat extract, dry yeast, inorganic nitrate, ammonium salt and so on; and a car- Table I

| Nutrient medium | Status of growth | Aerial mycelium | Soluble pigment |
| --- | --- | --- | --- |
| Czapeck agar | trace | none | none |
| asparagine-glucose agar | colorless to pale brown | light brownish gray | slightly pale brown |
| glycerol-calcium malate agar | colorless | slightly produced; grayish white | none |
| glucose-peptone agar | well grown | slightly produced; light brownish gray | none |
| bouillon agar | well grown; pale brown | none | none |
| triptone-yeast extract agar | slightly grown | none | none |
| starch-casein agar | well grown; colorless to dark brown | light brownish gray | brownish purple to dark brown |
| Starch-peptone-meat extract agar | well grown; pale yellowish brown | light brownish gray | light amber |
| egg-albumin agar | slightly grown; colorless | slightly produced; white powder | none |
| potato-glucose agar | well grown; colorless to brown | slightly produced; light brownish gray | brownish purple |
| potato plug | well grown; black | light brownish gray | dark brown to black |
| arginine-glucose agar | well grown; colorless to brownish purple | light purple to brownish purple | brownish purple |

C) Physiological properties:
1) Chromogenic action —
2) Cellulose decomposition —
3) Thyrosinase activity —
4) Hydrogen sulfide formation —
5) Reduction of nitrate +
6) Hydrolysis of starch +
7) Catalase activity +
8) Coagulation of milk — with strong peptonization
9) Liquefaction of gelation —

D) Utilization of carbohydrate
1) arabinose ±
2) raffinose ±
3) xylose —
4) galactose +
5) rhamnose —
6) mannose ±
7) lactose +
8) maltose +
9) fructose —
10) inositol —
11) salicin —
12) glucose + bon source such as starch hydrolyzate, glucose, molasses and the like. If necessary, there may be used any other suitable inorganic salts such as $K_2HPO_4$, $MgSO_4$, $FeSO_4$, $MnSO_4$ etc. and suitable additives such as antifoaming agent and the like.

The substance S-PI aimed at in the present invention accumulates in the broth obtained by fermentation of the Streptomyces naniwaensis (EF 44-201) in a nutrient medium in accordance with a conventional procedure such as a submerged culture, a stationary culture or a surface culture at a temperature of from about 20°C. to about 35°C. for about 10–96 hours.

The resulting substance S-PI may be recovered from the fermented broth advantageously based on the benefit of its chemical and physical properties in accordance with the usual procedure known in the art. As for example, the fermented broth may immediately be evaporated to dryness; or the broth may first be treated with active carbon to take up the substance S-PI. In the latter case, the recovered active carbon is then treated with a water-missible solvent such as methanol to elute the desired substance. From the eluate, the substance S-PI is recovered by evaporation to dryness.

The active carbon which carries the substance S-PI may otherwise be washed with an aqueous alkali solution previous to the step of the aforementioned treatment with the water-missible solvent.

In some cases, it has been found desirable to repeat the treatment of the recovered substance S-PI with active carbon in order to eliminate any colored materials. Alternatively, the crude substance S-PI may be recovered from the fermented broth by means of precipitation with ammonium sulfate.

The crude substance S-PI, if necessary, may be further purified by conventional column chromatography on SEPHADEX LH-20 (the registered trade mark), silica gel, ion exchange resins and the like.

In addition to the above, a purified substance S-PI may be obtained as the precipitate by acidifying the alkaline solution of the crude substance at a high concentration with a mineral acid.

The production of the substance Me S-PI that constitutes the other important aspect of the present invention can be effected by treating the aforementioned crude, semi-purified or purified substance S-PI with a known methyl esterifying agent such as diazomethane or methanol in the presence of thionyl chloride or dry hydrogen chloride. The resulting substance Me S-PI may be recovered by a conventional procedure in a form of white powder. Like the free substance S-PI, the substance Me S-PI thus obtained exhibits a marked inhibiting effect against pepsin and other acid proteases.

Followings are the physical properties of the substance S-PI and the substance Me S-PI:

1. Properties of the substance S-PI

The substance S-PI begins coloration at about 215°C., followed by decomposition at about 227°-230°C. It gives no sharp melting point.

The substance is sparingly soluble in water of from acid to neutral pH range but soluble in alkaline pH range; soluble in methanol and acetic acid; less soluble in ethanol and butanol; and practically insoluble in benzene, ether, petroleum ether, chloroform, carbon tetrachloride, hexane and ethyl acetate. In consideration of the result of paper electrophoresis and others, it is recognized that the substance S-PI is an acidic substance.

Within the region of ultraviolet to visible rays, the substance does not show any particular photo-absorption. Photo-adsorptions in the region of infra-red rays measured in a potassium bromide tablet are graphically shown in accompanying FIG. 1 wherein the wave lengths in $cm^{-1}$ unit are given on the abscissa and percentage absorption on the ordinate. In the graph, marked absorptions are observed at the following wave lengths:

3320, 3090, 2970, 1635, 1520-1555, 1387, 1370, 1290,
1223, 1175, 1155, 1070, and 855.

Specific rotation of the substance is from $-90°$ to $-93°$ ($c=1.0$ in methanol).

In ninhydrine reaction, the substance per se is negative while its hydrolyzate is positive.

Rydon-Smith reaction of the substance [H. N. Rydon and P. W. G. Smith; "Nature" 169, 922 (1952)] is positive.

Thin layer chromatography of the substance on silica gel $GF_{254}$ (the registered trade mark, sold by Merk A. G. of Germany) gave the following $R_f$ values respectively:

0.40-0.50 in methanol-benzene (1 : 1);
0.1-0.2 in methanol-chloroform-benzene (1 : 1 : 1); and
0.28-0.32 in benzene-methanol-acetic acid (80 : 20 : 5).

2. Properties of the substance Me S-PI

The substance Me S-PI has a melting point of 247°-249°C.

It is sparingly soluble in water throughout the entire sphere of pH range; soluble in methanol and acetic acid; sparingly soluble in ethanol and butanol. In benzene, ether, petroleum ether and chloroform, the substance is practically insoluble.

In view of the result of paper electrophoresis and others, it is recognized that the substance is a neutral substance.

Within the region of ultraviolet to visible rays, the substance does not show any particular photo-absorption.

Figure 2:
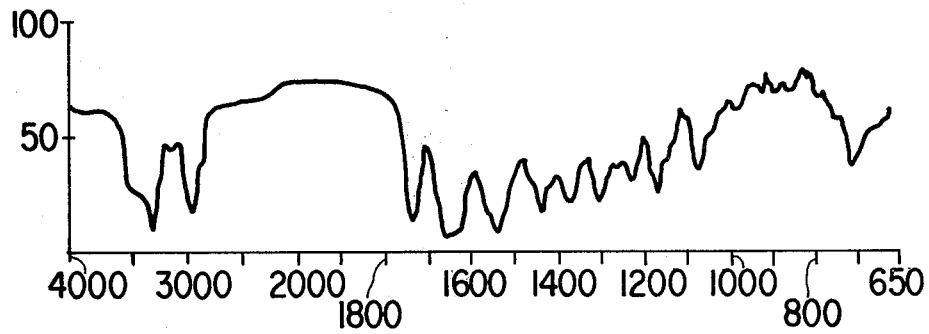

Infra-red spectrum of the compound in potassium bromide tablet is graphically shown in accompanying FIG. 2, wherein the wave lengths in $cm^{-1}$ unit are given on the abscissa and the percentage absorptions on the ordinate. In the graph, marked absorptions are observed at the following wave lengths;

3330, 3080, 1730, 1610-1660, 1520-1570, 1440, 1380,
1370, 1295, 1263, 1225, 1175, 1153, 1072, 990, 927, 892, 865, 850, 820, 795, 755 and 715.

Specific rotation of the substance is from $-91°$ to $-93°$ ($c=0.1$ in methanol).

In ninhydrine reaction, the substance per se is negative while its hydrolyzate is positive.

Rydon-Smith reaction of the substance [H. N. Rydon and P. W. G. Smith; "Nature" 169, 922 (1952)] is positive.

Thin layer chromatography of the substance on silica gel $GF_{254}$ (the registered trade mark, sold by Merk A. G. of Germany) gave the following $R_f$ values respectively:

0.80-0.90 in methanol-benzene (1 : 1);
0.85-0.95 in methanol-chloroform-benzene (1 : 1 : 1); and
0.35-0.40 in benzene-methanol-acetic aicd (80 : 20 : 5).

As the results of instrumental analyses such as amino acid analysis, gas chromatographic analysis, IR and NMR and high resolution mass spectrometry, we confirmed that the substance S-PI has the following structural formula:

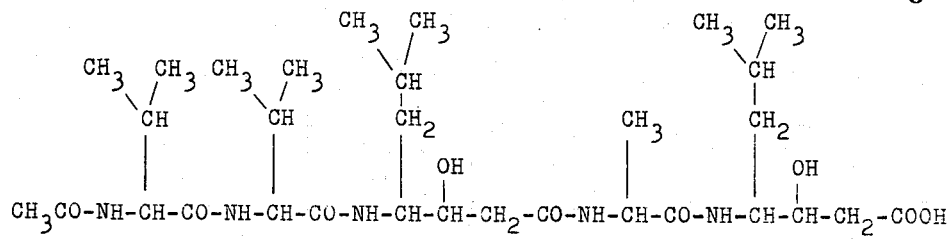

Pepsin inhibitory effect represented by the substance S-PI and the substance Me S-PI were demonstrated by the following test:

To each 2.5 ml of 1% casein aqueous solution (pH 2.5), there was added respectively 0.2 ml of an aqueous solution of the substance S-PI or 0.2 ml of an aqueous methanol solution of the substance Me S-PI, the concentrations of the substances in the respective solutions varying from one another.

To each of the resulting mixtures kept at the temperature of 37°C., was added 0.5 ml of a 5% aqueous solution of pepsin and the whole were incubated at 37°C. for 10 minutes. 2 ml of a 10% aqueous solution of trichloroacetic acid was added to each of the solutions and the mixtures were allowed to stand at 37°C. for 30 minutes.

Precipitated excess casein was removed by filtration.

To each 1 ml aliquot of the recovered filtrates was added 5 ml of a 0.44 molar aqueous solution of sodium carbonate and 1 ml of a phenol reagent (Folin's reagent), and the whole were shaken well. After 60 minutes, photo-absorption at 660 m$\mu$ wave length of each of the resulting mixtures was inspected. At the same time, two tests for control were carried out under the same conditions as those aforementioned with exception that the substance S-PI and the substance Me S-PI were eliminated.

In comparison with the control tests, the individual amount of the substance S-PI and the substance Me S-PI required for a 50% diminution of the pepsin activity were determined, which are then represented by the term $[PI]_{50\%}$ as the measure of pepsin inhibitory effect thereof.

The results thus obtained are:

$[PI]_{50\%} = 1.2-1.8$ $\mu$g for the substance S-PI, and
$[PI]_{50\%} = 1.2-1.8$ $\mu$g for the substance Me S-PI By the aforementioned chemical and physical as well as biological characteristics of the substance S-PI and the substance Me S-PI, they are distinguished from the hiterto known protease inhibitors and are considered the new compounds.

The following examples serve to illustrate embodiment of the invention.

Example 1

To 14 liters of an aqueous nutrient medium, which contains 4% of glucose, 2% of meat extract, 2% of polypeptone and 0.2% of sodium chloride, there was added 1 liter of fermented liquor previously prepared by incubating the Streptomyces naniwaensis (EF 44-201) under shaking at 27°C. for 24 hours in an aqueous nutrient medium having same composition as the above.

The whole was fermented at 27°C. for 24 hours under shaking at 300 r.p.m. and aerating at the rate of 15 liters per minute. The broth was then filtered to remove the cells. 11 Liters of the filtrate (pH about 5.4) were made to pH 2.0 by adding hydrochloric acid. 2.5% (w/v) of active carbon were added to the filtrate and the mixture was stirred for about 30 minutes to accomplish adsorption of the resultant substance S-PI on the carbon. The active carbon was recovered by filtration and extracted three times each with 4 liters of methanol. The combined methanol extracts were subjected to distillation under reduced pressure to remove the solvent.

The residue was dissolved in 1.1 liters of water. The solution was again treated with active carbon. The latter was recovered by filtration and washed two times each with 1 liter of a hot aqueous alkali solution. In this treatment, all the colored materials presented as impurity were removed almost completely. From the active carbon, the substance S-PI was eluted with 300 ml of methanol, and the methanol was expelled by distillation under reduced pressure. There were obtained 2.78 grs. of the residue which was dissolved again in methanol. The methanol solution was poured onto a column of 3 cm diameter and 45 cm height filled with SEPHADEX LH-20 and eluted with methanol. 150-210 ml of the fractions of the eluate were collected and the solvent was removed therefrom by distillation.

There were obtained 1.58 grs. of the substance S-PI as white amorphous powder.

Example 2

The Streptomyces naniwaensis (EF 44-201) was inoculated to 100 ml of a nutrient medium containing 5% of peptone, 0.1% of sodium chloride, 0.1% of dipotassium phosphate, 0.05% of magnesium sulfate, 0.001% of ferrous sulfate, 0.0001% of manganese sulfate, 0.0001% of copper sulfate and 0.0001% of zinc sulfate.

The whole was incubated at 27°C. for 48 hours under shaking. After the period of that time, accumulation of 1.2 mg/ml of the substance S-PI was found in the fermented broth.

The broth after filtration was further worked up successively by fractionation with ammonium sulfate, adsorption with active carbon, and column chromatography with SEPHADEX LH-20 and silica gel.

There was obtained 13 mg of the purified substance S-PI

Elementary analysis of sodium salt of the substance S-PI gave:

$C_{31}H_{56}N_5O_9Na$ (Molecular weight = 665.8)

|  | C | H | N |
|---|---|---|---|
| Calculated (%) | 55.92 | 8.48 | 10.52 |
| Found (%) | 55.74 | 8.71 | 10.66 |

Example 3

500 mg of substance S-PI obtained in Example 1 were dissolved in 10 ml of methanol. To the solution, after addition of 15 ml of ether, there were added dropwise an etheral solution of diazomethane under ice-cooling until yellow color of the solution was persistent. After completion of the reaction, the solvent was removed by distillation under reduced pressure.

The residue was subjected to successive chromatographical treatments on silica gel and SEPHADEX LH-20. There was obtained 350 mg of the substance Me S-PI in a form of white amorphous powder.

The product gave a single spot in thin layer chromatography.

Elementary analysis of the resulting substance gave: $C_{32}H_{59}N_5O_9$ (Molecular weight = 657.8)

|  | C | H | N |
|---|---|---|---|
| Calculated (%) | 58.42 | 9.03 | 10.64 |
| Found (%) | 58.59 | 9.04 | 10.80 |

Example 4

500 mg of the substance S-PI obtained in EXAMPLE 1 where dissolved in 50 ml of absolute methanol. The resulting solution was saturated with dry hydrogen chloride. The solvent was then removed from the solution by distillation under reduced pressure. The residue was dissolved in a small amount (about 5 ml) of methanol and followed by concentration under reduced pressure. The treatments with methanol were further repeated three times. The resulting residue was dissolved in a small amound (about 5 ml) of methanol, and any solid materials were removed by filtration. The filtrate was subjected to chromatography on silica gel and then on SEPHADEX LH-20. There were obtained 300 mg of the substance Me S-PI in a form of white amorphous powder.

The product in thin layer chromatography gave a single spot.

What is claimed is:

1. A pepsin inhibitor S-PI which is acidic; soluble in water and aqueous alkali; insoluble in benzene, ether, petroleum, ether, chloroform, carbon tetrachloride, hexane and ethyl acetate; reacting negatively in the ninhydrin test, but positively after hydrolysis; convertible to a methyl ester by reaction with diazomethane in the presence of hydrogen chloride, convertible to a methyl ester by reaction with diazomethane in the presence of hydrogen chloride; and exhibiting an infrared curve substantially as shown in FIG. 1 hereof in a potassium bromide tablet.

2. A pepsin inhibitor Me S-PI which is neutral in electrophoresis; soluble in methanol; insoluble in benzene, ether, petroleum ether and chloroform; and exhibiting an infrared curve substantially as shown in FIG. 2 hereof in a potassium bromide tablet.

* * * * *